Patented Oct. 8, 1946

UNITED STATES PATENT OFFICE 2,408,829

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,753

5 Claims. (Cl. 260—239.5)

1

The invention relates to the preparation of new pseudo-sapogenin compounds from steroidal sapogenin compounds such as the lilagenin type and the yuccagenin type described in my copending application, Serial No. 535,748, filed May 15, 1944. The new pseudo compounds are useful as intermediates for preparations of physiologically active compounds, such as sex hormones.

The reaction by which steroidal sapogenins are isomerized to the pseudo-genins have been described in detail in the copending Patents Nos. 2,352,848 and 2,352,852, issued July 4, 1944. These also include proof of structure of the pseudogenin side chain.

The present invention relates more particularly to the preparation of pseudo-sapogenin compounds by way of isomerization of the corresponding sapogenin. The new compounds have the formula,

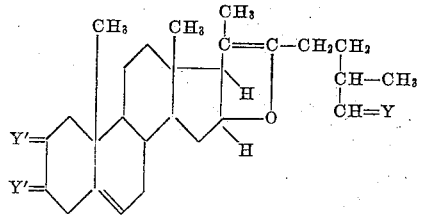

where Y and Y' are members of the class

and groups hydrolyzable to

The invention is illustrated by the following examples.

Example 1

A mixture of 10 grams of yuccagenin diacetate and 15 cc. of acetic anhydride contained in a sealed tube is heated at 200° C. for 10 hours. After removal of the acetic anhydride and treatment of a methanol solution of the residue with charcoal ("Norite" brand), the product is then crystallized from methanol to give a product of M. P. 141–145° C. Recrystallization from methanol raises the melting point to 145–147° C. This is pseudo-yuccagenin triacetate.

Anal.: Calc'd for $C_{33}H_{48}O_7$: C, 71.2; H, 8.7%. Found: C, 71.5; H, 9.0%.

The triacetate can be hydrolyzed with dilute alkali, extracted with ether and crystallized from ether to give needles of pseudo-yuccagenin of M. P. 181–182° C.

Example 2

20 grams of lilagenin diacetate (J. Amer. Chem. Soc. 62, 2620 (1940)) melting at 156° C. and 30 cc. of acetic anhydride are heated in a sealed tube at about 200° C. for 12 hours. The acetic anhydride is removed by distillation and the residue taken up in methanol and the resulting solution treated with decolorizing charcoal and then crystallized from the methanol by concentration and cooling. The crystals are filtered off and dried to give a product of M. P. 146° C. which also melts at 146° C. when mixed with pseudo-yuccagenin triacetate from Example 1. It gives the correct analysis for $C_{33}H_{48}O_7$ and can be hydrolyzed like the triacetate of Example 1 to give pseudo-yuccagenin of M. P. 182° C.

The transformations of these examples can be represented as follows:

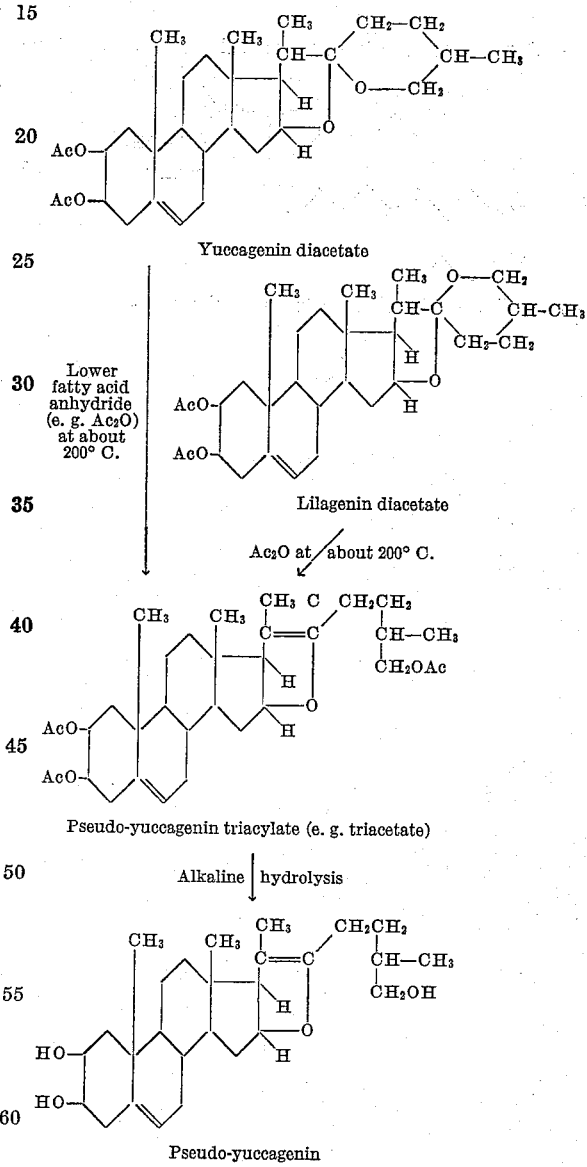

While for ease of manipulation and economy the preferred isomerizing agent is acetic anhydride, other lower aliphatic acid anhydrides may also be used. The preferred temperature range lies between 190° and 200° C. although the reaction also takes place as low as 170° or as high as 230°. The example is intended as illustrative and the invention is not necessarily limited to the conditions and reactants therein cited.

What I claim is:

1. Compounds having the formula,

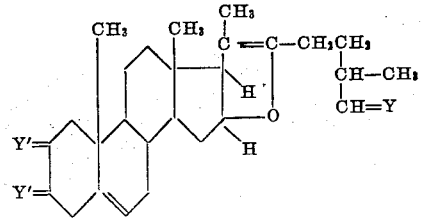

where Y and Y' are members of the class

and groups hydrolyzable to

2. Compounds having the formula,

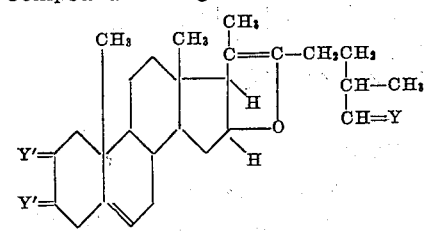

where Y and Y' are members of the class

and organic carboxylic acid ester groups hydrolyzable to

3. Compounds having the formula,

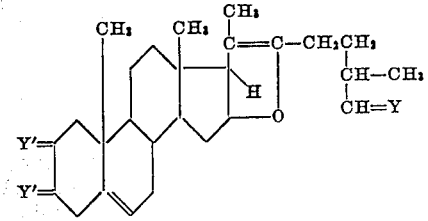

where Y and Y' are lower fatty acid ester groups.

4. Pseudo-yuccagenin triacetate having the formula,

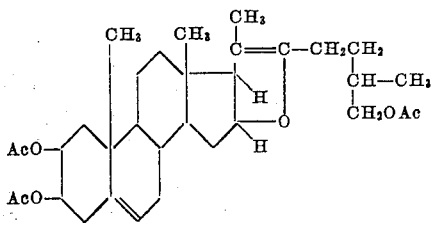

5. Pseudo-yuccagenin having the formula,

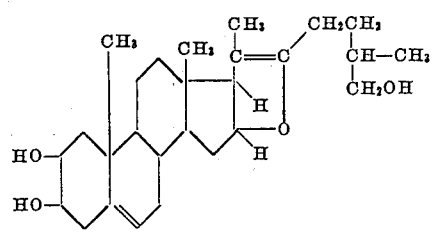

ROMEO B. WAGNER.